(12) United States Patent
Kalmbach et al.

(10) Patent No.: US 8,992,367 B2
(45) Date of Patent: *Mar. 31, 2015

(54) DRIVE DEVICE FOR A MOTOR VEHICLE

(71) Applicant: Siemens Aktiengesellschaft, München (DE)

(72) Inventors: Klaus Kalmbach, Mössingen (DE); Klaus Schleicher, Nürnberg (DE); Janina Steinz, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,936

(22) Filed: Apr. 15, 2013

(65) Prior Publication Data

US 2013/0274050 A1 Oct. 17, 2013

(30) Foreign Application Priority Data

Apr. 16, 2012 (DE) .................. 10 2012 206 142

(51) Int. Cl.
| | |
|---|---|
| *F16H 48/30* | (2012.01) |
| *F16H 3/44* | (2006.01) |
| *F16H 48/06* | (2006.01) |
| *H02K 7/116* | (2006.01) |
| *H02K 7/00* | (2006.01) |
| *F16H 1/46* | (2006.01) |
| *F16H 48/08* | (2006.01) |
| *B60K 1/00* | (2006.01) |

(52) U.S. Cl.
CPC .................. *F16H 3/44* (2013.01); *F16H 48/06* (2013.01); *H02K 7/116* (2013.01); *H02K 7/006* (2013.01); *F16H 1/46* (2013.01); *F16H 48/08* (2013.01); *B60K 2001/001* (2013.01)
USPC .......................................... 475/150

(58) Field of Classification Search
CPC ............ F16H 2057/02034; F16H 3/44; F16H 57/031; F16H 48/06; F16H 57/037; F16H 48/00; H02K 7/14; B60K 1/02; B60K 2001/001; B60K 6/48; B60K 17/165; B60K 17/046
USPC .................................. 180/65.9; 475/149, 150
See application file for complete search history.

(56) References Cited

U.S. PATENT DOCUMENTS

| | | | | |
|---|---|---|---|---|
| 4,467,230 | A * | 8/1984 | Rovinsky ......................... | 310/83 |
| 5,372,213 | A * | 12/1994 | Hasebe et al. ............... | 180/65.6 |
| 5,396,968 | A * | 3/1995 | Hasebe et al. ............... | 180/65.6 |
| 5,528,094 | A * | 6/1996 | Hasebe et al. ................ | 310/112 |
| 5,637,048 | A * | 6/1997 | Maeda et al. .................. | 475/150 |
| 5,759,128 | A * | 6/1998 | Mizutani et al. .............. | 475/149 |
| 5,845,732 | A * | 12/1998 | Taniguchi et al. ........... | 180/65.6 |
| 7,316,627 | B2 * | 1/2008 | Bennett ......................... | 475/149 |
| 7,497,286 | B2 * | 3/2009 | Keller et al. ................. | 180/65.6 |
| 7,717,203 | B2 * | 5/2010 | Yoshino et al. ............ | 180/65.51 |

(Continued)

FOREIGN PATENT DOCUMENTS

DE 102005055690 A1 5/2007

*Primary Examiner* — Dirk Wright

(74) *Attorney, Agent, or Firm* — Henry M. Feiereisen LLC

(57) ABSTRACT

A drive device for a vehicle includes at least one electric machine having at least one rotor element which is configured to delimit an installation area in a radial direction. Disposed, at least partly, in the installation area, is at least one transmission device which is configured to be driven by the electric machine via the rotor element.

13 Claims, 1 Drawing Sheet

(56) References Cited

U.S. PATENT DOCUMENTS

| | | | |
|---|---|---|---|
| 7,815,535 B2* | 10/2010 | Ai et al. | 475/149 |
| 8,177,007 B2* | 5/2012 | Abe et al. | 180/65.285 |
| 8,562,470 B2* | 10/2013 | Yang | 475/9 |
| 8,633,622 B2* | 1/2014 | Chamberlin et al. | 310/83 |
| 8,672,070 B2* | 3/2014 | Palfai et al. | 180/65.6 |
| 2005/0034906 A1* | 2/2005 | Liao | 180/65.6 |
| 2011/0224043 A1* | 9/2011 | Bachmann et al. | 475/149 |
| 2012/0129644 A1* | 5/2012 | Palfai et al. | 475/150 |
| 2013/0123057 A1* | 5/2013 | Markl | 475/150 |
| 2013/0123058 A1* | 5/2013 | Markl | 475/150 |
| 2013/0274051 A1* | 10/2013 | Kalmbach et al. | 475/150 |
| 2013/0274052 A1* | 10/2013 | Kalmbach et al. | 475/150 |
| 2013/0274053 A1* | 10/2013 | Bauerlein et al. | 475/150 |

* cited by examiner

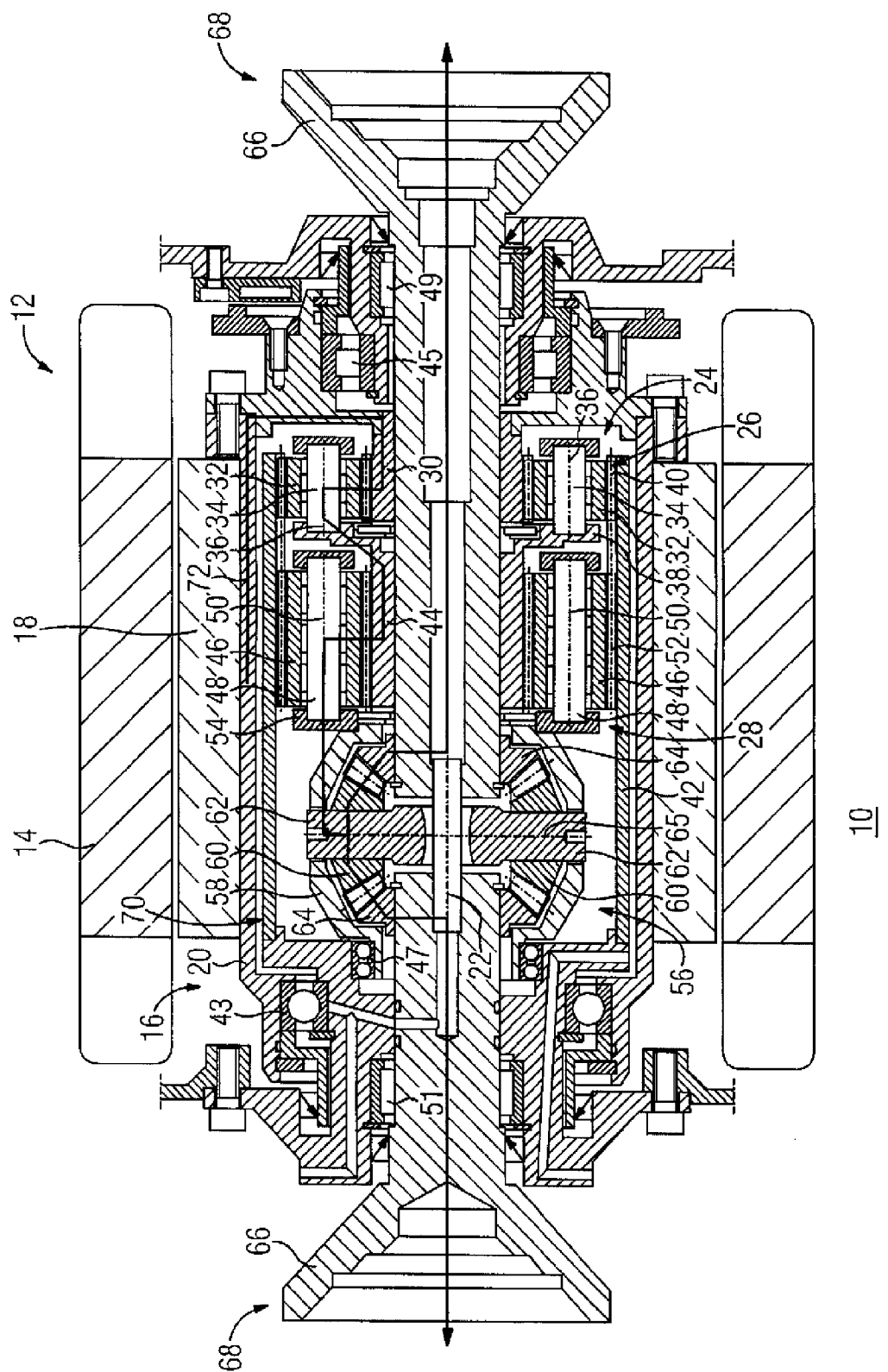

DRIVE DEVICE FOR A MOTOR VEHICLE

CROSS-REFERENCES TO RELATED APPLICATIONS

This application claims the priority of German Patent Application, Ser. No. 10 2012 206 142.8, filed Apr. 16, 2012, pursuant to 35 U.S.C. 119(a)-(d), the content of which is incorporated herein by reference in its entirety as if fully set forth herein.

BACKGROUND OF THE INVENTION

The present invention relates to a drive device for a motor vehicle.

The following discussion of related art is provided to assist the reader in understanding the advantages of the invention, and is not to be construed as an admission that this related art is prior art to this invention.

Electric and hybrid vehicles which are able to be driven by at least one electric motor via a corresponding drive device of the motor vehicle are known from the prior art as well as from series production of motor vehicles, especially of automobiles. In such motor vehicles, wheels of the vehicle are driven by an electric motor via corresponding drive shafts.

A transaxle construction is known for electric motors, which is not to be confused in this context with the arrangement of one drive unit in a front area of the vehicle and an associated transmission on a rear drive axle of the vehicle. Transaxle construction here is especially to be understood as the electric motor, especially its rotor element, being installed between driven wheels transverse to the longitudinal direction of the vehicle. In this transaxle construction torques provided by an electric motor via its rotor element to drive the wheels are initially taken off at a first axial end of the electric motor on a first side and then, for example via a hollow shaft, fed to a second side spaced away from the first side in the transverse direction of the vehicle to a second axial end of the electric motor spaced away from the first axial end in the transverse direction of the vehicle. Two concentric shafts are provided for this type of arrangement, which demand a respective and thus duplicated outlay for example to present separate supports of the shafts. In addition, these drive devices require relatively large installation space in the axial direction of the electric motor.

It would therefore be desirable and advantageous to provide an improved drive device for a vehicle to obviate prior art shortcomings and to construct as to have small installation space requirement.

SUMMARY OF THE INVENTION

According to one aspect of the present invention, drive device for a vehicle, said drive device includes at least one electric machine having at least one rotor element which is configured to delimit an installation area in a radial direction, and at least one transmission device disposed, at least partly, in the installation area and configured to be driven by the electric machine via the rotor element.

In accordance with the present invention, torque provided by the electric machine in its motor mode can be introduced into the transmission device for converting and/or transmitting the torque. At least one installation area is delimited by the rotor element in the radial direction of the electric machine, especially of the rotor element, in which the transmission device is at least partly disposed. In other words the transmission device is covered over in the radial direction at least partly by the rotor element. The rotor element thus surrounds the transmission device at least partly. As a result of the arrangement of the transmission device at least partly in the rotor element, the transmission device is integrated at least partly into the rotor element, so that a drive device according to the invention, especially in the axial direction of the electric machine, has an especially small installation space requirement. The transmission device is not flanged onto the rotor element in the axial direction or linked or able to be linked to the rotor element in another torque-proof manner, so that an especially short installation length in the axial direction of the electrical machine is created. Thus a loss of installation space which would result from the arrangement of the drive device in the axial direction next to the rotor element can be avoided.

According to another advantageous feature of the invention, the rotor element and the transmission device can be disposed, at least partly, coaxially to one another. In other words, at least some of rotatable transmission elements of the transmission device are disposed coaxially to the rotor element. Thus, the drive device requires especially little installation space.

According to another advantageous feature of the invention, the transmission device can include a differential gear which may be disposed partly or completely in the installation area. The differential gear makes it possible to present an especially advantageous drive of the vehicle through the drive device since the differential gear—for example when the vehicle negotiates a curve—permits speeds of the wheels of the vehicle driven via the differential gear that differ from one another, without this resulting in undesired stress on the drive device.

According to another advantageous feature of the invention, the transmission device can include at least one transmission stage which is configured to be driven by the electric machine, with the differential gear configured to be driven via the transmission stage and the rotor element by the electric machine. It is thus possible to realize especially advantageous gear ratios of the transmission device, which benefits drivability.

According to another advantageous feature of the invention, the transmission stage and the differential gear may be disposed partly or completely in the installation area. This further reduces need for installation space. In this way, the transmission stage and the differential gear are covered over in the radial direction completely by the rotor element. Advantageously, the transmission stage and the rotor element are arranged coaxially to one another.

According to another advantageous feature of the invention, the transmission device can include a plurality of transmission stages which are all disposed partly or completely in the installation area. This keeps the installation space requirement small, especially in the axial direction. Especially advantageous gear ratios can be realized when the differential transmission is able to be driven via the last of the transmission stages connected serially to one another relative to a torque flow through the transmission stages. In this case the differential gear is connected or disposed serially, i.e. in series to the transmission stages.

The rotor element may include for example an active rotor part and a rotor carrier on which the active rotor part is held. In this case the transmission device and the differential gear provided if necessary are covered over at least partly, especially completely, by the active rotor part and/or by the rotor carrier.

The active rotor part of an electric machine is especially to be understood as a rotor of the electric machine. The electric machine in this case is able to be operated in its motor mode as an electric motor. In addition there can be provision for the electric machine to be operated in a generator mode as a generator. Furthermore the term active rotor part for example also includes a secondary part of the linear motor. The active rotor parts can be manufactured by packaging electrical steel for example. As an alternative, materials such as soft-magnetic materials, which can for example be injected like plastic, or air core inductors without iron may be other conceivable options for this purpose.

A further advantage of the inventive drive device is that, by the arrangement of the transmission device, especially the differential gear, in the rotor element or in the installation area, a flow of force and/or torque can be routed to the driven wheels of the vehicle, especially via respective drive shafts, at least essentially directly to the wheels from the axial center of the rotor element via the respective drive shaft.

In contrast to a conventional transaxle construction, torques or forces do thus not have to be first routed to one side and subsequently via a hollow shaft to the other side, but can be routed immediately from the central area of the electric machine to the wheels. Additionally the drive device, especially by comparison with drive devices with a hollow shaft, has a simple and thereby low-cost construction. In such cases the transmission device, especially its transmission stage, in relation to the flow of force and/or torque from the rotor element via the transmission stage to any differential gear that may be provided, is connected serially to the rotor element and is linked or is able to be linked to the latter.

According to another advantageous feature of the invention, the transmission device can include at least one transmission stage constructed as a first planetary gear having a first sun wheel, at least one first planetary wheel element, and at least one first hollow wheel. Through this an especially favorable and also effective and efficient conversion of the torque provided by the electric machine is realized, since such a planetary gear has a very high power density and can also provide relatively high transmission ratios in a very favorable way as regards installation space. Of course, the at least one transmission stage may also be realized by way of a different configuration.

According to another advantageous feature of the invention, the rotor element can include a rotor carrier with which the sun wheel of the planetary gear is linked. Thus, torque provided by the electric motor is introduced via the rotor carrier and the sun wheel into the planetary gear, with the sun wheel thus representing a transmission input element of the planetary gear.

According to another advantageous feature of the invention, the stationary hollow wheel can be integrated into a housing element of the drive device, especially of the transmission device. In other words, the hollow wheel is fixed, so that it does not rotate around the axis or rotation around which the sun wheel rotates. To fix the hollow wheel it is attached to the housing element for example, wherein it is integrated into the housing element. As a result, the drive device only requires very little installation space.

When the planetary wheel element of the planetary gear is supported on a planetary carrier of the planetary gear, this is advantageous to the extent that forces acting in the radial direction can be supported by the planetary carrier. Advantageously, the differential gear is linked to the planetary carrier. In other words, the differential gear is driven via the planetary carrier, so that the planetary carrier thus functions as the output element of the planetary gear. The drive device thus requires especially little installation space. Furthermore, torque provided by the electrical machine can be converted, output from the planetary gear via the planetary carrier and introduced into the differential gear especially effectively and efficiently.

According to another advantageous feature of the invention, the transmission device can include at least a second transmission stage configured as a second planetary gear with a second sun wheel, at least one second planetary wheel element, and at least one second hollow wheel, and constructed to be driven via the first planetary gear. Thus, the second planetary gear is connected serially downstream from the first planetary gear. This enables especially high transmission ratios to be realized in very little installation space.

To realize a smaller number of parts and a smaller installation space requirement, the second, especially stationary, hollow wheel can be integrated into a housing element of the drive device, especially of the transmission device. The second hollow wheel is also advantageously fixed and cannot rotate around the axis of rotation. To fix the second hollow wheel it is linked to the housing element, wherein it is integrated into the housing element.

In the embodiment with the at least two planetary gears, the first sun wheel of the first planetary gear advantageously linked to the rotor carrier, so that the first sun wheel of the first planetary gear is driven by the rotor carrier.

The second transmission stage, i.e. the second planetary gear, can be advantageously disposed coaxially to the first transmission stage, resulting in a more favorable layout of the drive device as regards installation space and cost.

According to another advantageous feature of the invention, the first planetary wheel element of the first planetary gear can be supported on the first planetary carrier of the first planetary gear, with the second sun wheel of the second planetary gear being linked to the first planetary carrier of the first planetary gear. In other words, the second sun wheel is driven via the first planetary carrier of the first planetary gear, through which the torque provided by the electric machine can be converted in an especially efficient and effective manner as regards the space required.

When the transmission device has more than two transmission stages, which are each embodied as planetary gears, this arrangement or connection of the respective planetary carriers with the sun wheel of the downstream planetary gear is similar to that described above.

Advantageously, the second planetary wheel element of the second planetary gear can be supported on a second planetary carrier of the second planetary gear, wherein any differential gear which might be provided is linked to the second planetary carrier. The result is a very favorable layout of the drive device as regards installation space required. In other words this means that—if the transmission device comprises two or more transmission stages embodied as planetary gears—the corresponding planetary carrier of the last planetary gear in the flow of force and/or torque from the last differential gear of the planetary gears is linked to the differential gear, so that the differential gear is driven via the planetary carrier of the last planetary gear in the force and/or torque flow.

When the transmission device includes a plurality of transmission stages for example, i.e. three or more transmission stages, advantageously all transmission stages are configured as planetary gears with a respective sun wheel, at least one respective planetary wheel element and at least one respective, especially fixed, hollow wheel. To realize an especially small installation space requirement in this case there is preferably provision for all hollow wheels to be integrated into the housing element. This means for example that the respective hollow wheel is embodied in one piece with the corresponding housing element.

According to another advantageous feature of the invention, the differential gear can be constructed as a bevel differential gear. This means that balance wheels of the differential gear are bevel wheels, so that the differential gear and thus the drive device have a very small space requirement.

When installed into a vehicle, a drive device according to the invention makes it possible to route the drive shafts, which are driven via the differential gear and via which the wheels of the vehicle are driven, directly, i.e. without diversions, to respective axial machine sides, i.e. at the respective axial ends of the electric machine. In other words the torque output via the differential gear and transmitted to the drive shaft will be routed directly to the driven wheels, without at least one further transmission stage and thus a further conversion of the torque being provided in the flow of force and/or torque from the differential gear to the wheels. Such an additional transmission stage can be dispensed with since a drive device according to the invention enables an effective and efficient conversion of the torque provided by the electric machine in a very small installation space. To this end the single or multi-stage transmission device as well as any differential gear that may be provided is integrated into the rotor element for ideal and direct distribution of the torque or the force and/or torque flow at least essentially from the axial center of the rotor elements to the drive shaft.

The electrical machine can be embodied as an asynchronous machine, especially as an asynchronous motor or as a synchronous machine, for example as a permanent magnet machine, especially a permanent magnet motor, and can be operated in a motor mode in which it drives the transmission device.

There can also be provision for the electric machine to be able to be operated in a generator mode, so that for example mechanical energy introduced into the electric machine can be converted via driven wheels of the motor vehicle, the transmission device and the rotor at least partly into electrical energy. This enables regenerative braking to be carried out for example.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic longitudinal sectional view of a drive device for a motor vehicle.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment may be illustrated by graphic symbols, phantom lines, diagrammatic representations and fragmentary views. In certain instances, details which are not necessary for an understanding of the present invention or which render other details difficult to perceive may have been omitted. The features and combinations of features specified in the description as well as the features and combinations of features specified in the description of the FIGURE and/or in the FIGURE alone are able to be used not only in the respectively specified combination, but also in other combinations or on their own, without departing from the framework of the invention.

Turning now to the FIGURE, there is shown a schematic longitudinal sectional view of a drive device for a motor vehicle embodied for example as a hybrid or electric vehicle, with an electric machine having a rotor element into which a transmission device having two transmission stages is integrated with a differential gear connected serially downstream from one of the transmission stages.

The sole FIGURE shows a drive device according to the present invention, generally designated by reference numeral 10 for a motor vehicle, which is embodied for example as an automobile. The motor vehicle can also be embodied as a hybrid vehicle or as an electric vehicle, especially with a range extender.

The drive device 10 includes an electric machine 12 having a stator 14, shown schematically only, and a rotor element 16, also shown schematically. The rotor element 16 has an active rotor part 18 with a magnetic circuit comprised of coils and/or magnets as well as a rotor carrier 20, to which the active rotor part 18 is attached. The rotor element 16 is rotatable about an axis of rotation 22.

The drive device 10 additionally includes a transmission device 24, which has, as its first transmission stage, a first planetary gear 26 and, as its second transmission stage, a second planetary gear 28. The first planetary gear 26 has a first sun wheel 30, which is rotatable about the axis of rotation 22 and coupled with the rotor carrier 20. As a result, torque provided by the electric machine 12, when operating in a motor mode via the rotor carrier 20 for example, is introduced into the first sun wheel 30, so that the first sun wheel 30 is driven by the rotor carrier 20. The first planetary gear 26 has a plurality of first planetary wheel elements 32 in mesh with the first sun wheel 30 via respective teeth. The first planetary gear elements 32 are supported on respective first planetary wheel studs 34 rotatable around an axis of rotation 36 and also via the first planetary wheel studs 34 on a first planetary gear carrier 38 of the first planetary gear 26. The first planetary wheel elements 32 can also rotate about the axis of rotation 22.

Furthermore, the first planetary gear 26 has a first stationary hollow wheel 40, which is integrated into a transmission housing 42 of the transmission device 24. Thus, the transmission housing 42 and the first hollow wheel 40 are embodied in one piece with one another, wherein the first hollow wheel 40 does not rotate about the axis of rotation 22 during operation of the drive device 10. The first planetary wheel elements 32 are hereby in mesh via teeth with the first hollow wheel 40. Of course, the presence of a rotating hollow wheel is also conceivable. In addition, it would be conceivable to support the rotor carrier 20 directly on the hollow wheel outer diameter, for example via a friction bearing, as with turbochargers, or via needle bearings.

The second planetary gear 28 has a second sun wheel 44, which is rotatable about the axis of rotation 22 and coupled or linked to the first planetary carrier 38. As a result, the second sun wheel 44 is driven via the first planetary carrier 38 when the drive device 10 is operated. The second planetary gear 28 also includes a plurality of second planetary wheel elements 46 in mesh via teeth with the second sun wheel 44. The second planetary wheel elements 46 are supported rotatably on respective second planetary wheel studs 48 around respective axes of rotation 50 and can also rotate around the axis of rotation 22.

The second planetary gear 28 has a stationary second hollow wheel 52 in mesh via teeth with the second planetary wheel elements 46 and likewise integrated into the transmission housing 42. The second planetary wheel elements 46 are supported or braced by their second planetary wheel studs 48 on a second planetary carrier 54.

The transmission device 24 additionally includes a differential gear 56 with a so-called differential case 58. The differential gear 56 also has a plurality of balance wheels 60, which are supported rotatably via respective balance studs 62 on the differential case 58 around an axis of rotation 65. Furthermore the differential gear 56 has shaft wheels 64, which are linked via teeth to drive shafts 66 in a torque-proof manner. The drive shafts 66 have respective connections 68, via which driven wheels of the vehicle can be linked in a torque-proof manner to the drive shafts 66.

As can be seen from the FIGURE, the differential gear 56 is embodied as a bevel differential gear, wherein the balance wheels 60 and the shaft wheels 64 are embodied as bevel gears meshing with each other via teeth. The differential gear 56 has four balance wheels 60 for example.

As can also be seen from the FIGURE, the transmission device 24 is not flanged into the rotor element 16 in axial arrangement, but by contrast is integrated into the rotor element 16.

The rotor element 16 delimits an installation area 70 in a radial direction, in which the two-stage transmission device 24 is housed with the differential gear 56. The differential gear 56 and/or the first planetary gear 26 may hereby project in the axial direction beyond the active rotor part 18; however neither differential gear 56 nor the first planetary gear 26 projects beyond the rotor carrier 20 in the axial direction, so that the planetary gears 26, 28 and the differential gear 56 are completely accommodated in the installation area 70 and are surrounded and covered in the radial direction by the rotor element 16, especially the rotor carrier 20.

This projection beyond the active rotor part 18 by the differential gear 56 and/or the first planetary gear 26 in the axial direction can however be avoided with a different ratio of rotor length/diameter/speed/torque.

Optionally, the provision of a rotating hollow wheel is conceivable. In addition, it is conceivable to support the rotor carrier 20 directly on the hollow wheel outer diameter, for example by a friction bearing, as with turbochargers, or by needle bearings.

This avoids loss of installation space in an axial direction, since neither the differential gear 56 nor the planetary gear 26, 28 are flanged axially onto the rotor element 16. In addition, there is an at least essentially ideal and direct distribution of the torque provided by the electric machine 12 in its motor mode via its rotor element 16 at least essentially from the axial center of the rotor element 16 to the two drive shafts 66. This is indicated in the FIGURE by the bold line 72. The bold line 72 characterizes hereby a flow of force and torque from the electric machine 12 in its motor mode via its rotor element 16 and especially its rotor carrier 20 via the planetary gear 26, 28 and the differential gear 56 to the drive shafts 66. The rotor element 16, the planetary gear 26, 28 and the differential gear 56 are hereby connected in series with one another in relation to the force and/or torque flow (bold line 72).

The first sun wheel 30 functions as first input element of the planetary gear 26, since torque is introduced into the first planetary gear 26 via the first sun wheel 30.

The first planetary carrier 38 functions as first output element of the first planetary gear 26, since torque is derived from the first planetary gear 26.

The second sun wheel 44 linked to the first planetary carrier 38 functions as a second input element of the second planetary gear 28, while the second planetary carrier 54 of the second planetary gear 28 serves as a second output element of the second planetary gear 28 and is linked to the differential gear 56, especially to its differential case 58. In other words, the differential case 58 of the differential gear 56 is driven via the second planetary carrier 54, so that the balance wheels 60, and via these the shaft wheels 64, are rotated around the axis of rotation 22 via the differential case 58. Thus the drive shafts 66 are driven to also rotate about the axis of rotation 22.

Roller bearings 43, 45 are provided to support the rotor element 16. In addition a further roller bearing 47 is provided for supporting the differential case 58. The drive shafts 66 are supported by roller bearings 49, 51.

Through the integration of the planetary gears 26, 28 and the differential gear 56 into the rotor element 16 as well as the corresponding embodiment of the transmission stages as the planetary gears 26, 28, the drive device 10 requires especially little space and makes possible the efficient and effective transmission and conversion of the torque provided by the electric machine 12 through to the drive shafts 66.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive device for a vehicle, said drive device comprising:
    at least one electric machine having at least one rotor element which is configured to delimit an installation area in a radial direction; and
    at least one transmission device disposed, at least partly, in the installation area and configured to be driven by the electric machine via the rotor element,
    a housing element,
    wherein the transmission device has a first transmission stage constructed as a first planetary gear with a first sun wheel, at least one first planetary wheel element, and at least one first hollow wheel,
    wherein the transmission device also has a second transmission stage configured as a second planetary gear with a second sun wheel, at least one second planetary wheel element, and at least one second hollow wheel, and constructed to be drive via the first planetary gear,
    wherein said first and second hollow wheels are fixed and integrated in the housing element, and said first and second hollow wheels and the housing element are formed of one piece.

2. The drive device of claim 1, wherein the rotor element and the transmission device are disposed coaxially to one another.

3. The drive device of claim 1, wherein the transmission device comprises a differential gear.

4. The drive device of claim 3, wherein the transmission device comprises at least one transmission stage configured to be driven by the electric machine, said differential gear configured to be driven via the transmission stage and the rotor element by the electric machine.

5. The drive device of claim 1, wherein the transmission device comprises a plurality of transmission stages disposed at least partly in the installation area.

6. The drive device of claim 1, wherein the transmission device comprises a plurality of transmission stages disposed entirely in the installation area.

7. The drive device of claim 4, wherein the transmission device comprises a plurality of transmission stages connected in series with one another to thereby define a first transmission stage and a last transmission stage, said differential gear being configured to be driven via the last transmission stage.

8. The drive device of claim 1, wherein the rotor element comprises a rotor carrier with which the sun wheel of the planetary gear is linked.

9. The drive device of claim 1, wherein the planetary gear comprises a planetary carrier linked to a differential gear of the transmission device, said planetary wheel element being supported on the planetary carrier.

10. The drive device of claim 1, wherein the second planetary gear is constructed to be driven via the first planetary gear.

11. The drive device of claim 1, wherein the first planetary gear has a planetary carrier linked to the second sun wheel, said first planetary wheel element being supported on the planetary carrier.

12. The drive device of claim 1, wherein the second planetary gear has a second planetary carrier linked to a differential gear of the transmission device, said second planetary wheel element being supported on the second planetary carrier.

13. The drive device of claim 1, wherein the transmission device comprises a differential gear constructed as a bevel wheel differential gear.

* * * * *